April 11, 1967 D. R. FALKENBERG ETAL 3,313,421
CARTRIDGE FOR FILTERING MEDIUM
Filed Dec. 9, 1963 2 Sheets-Sheet 1
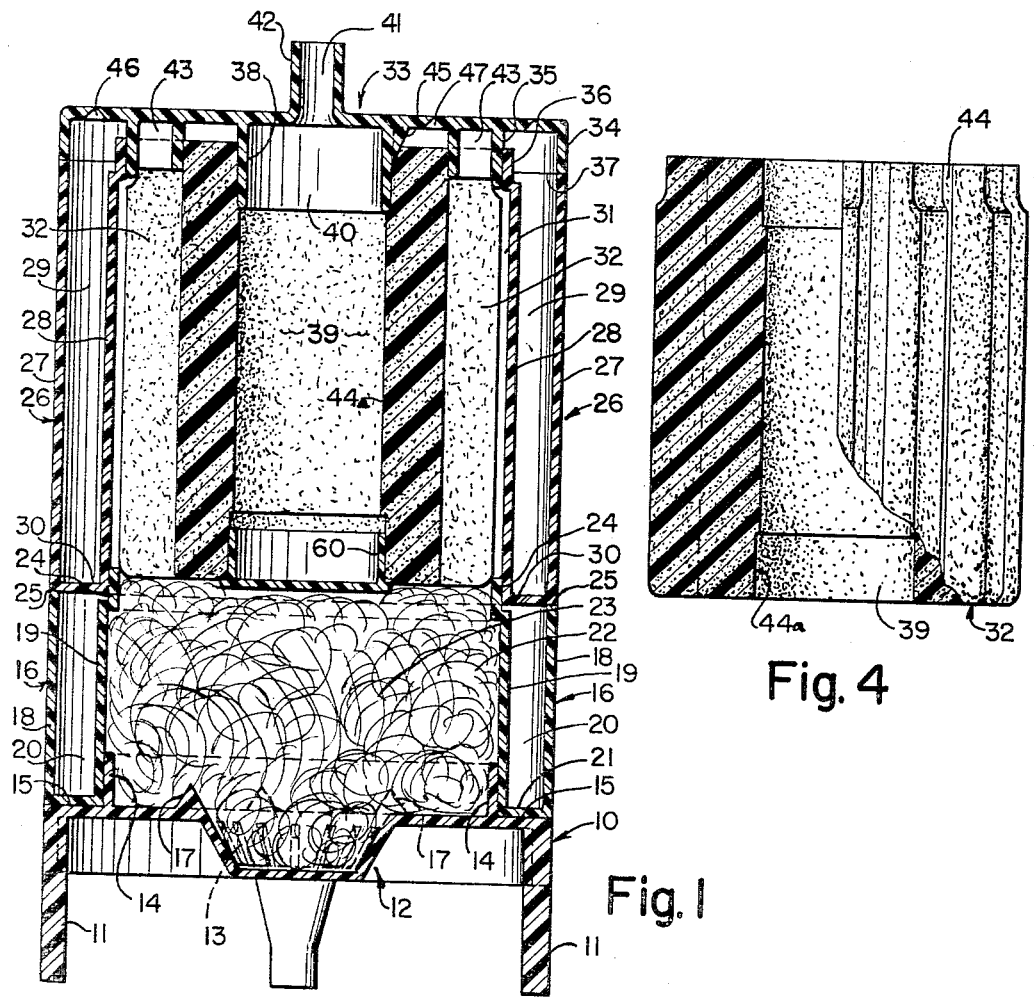
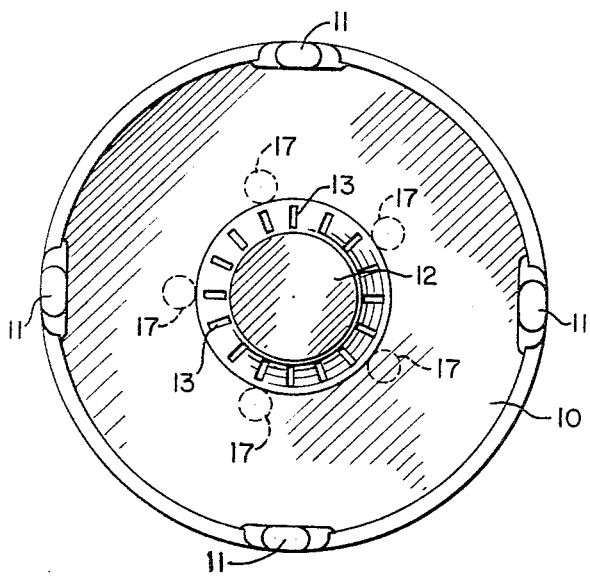
INVENTORS.
Edward L. Sharpe
BY Douglass R. Falkenburg
Schramm, Kramer & Sturges
ATTORNEYS.

April 11, 1967 D. R. FALKENBERG ETAL 3,313,421
CARTRIDGE FOR FILTERING MEDIUM
Filed Dec. 9, 1963 2 Sheets-Sheet 2

INVENTORS
Edward L. Sharpe
BY Douglass R. Falkenburg

Schramm, Kramer & Sturges
ATTORNEYS 3,313,421
CARTRIDGE FOR FILTERING MEDIUM
Douglass R. Falkenberg, 20997 Westlake Road, Rocky River, Ohio 44116, and Edward L. Sharpe, Elyria, Ohio; said Sharpe assignor to said Falkenberg
Filed Dec. 9, 1963, Ser. No. 329,166
3 Claims. (Cl. 210—314)

This invention relates, as indicated, to an improved cartridge for containing a filter medium, and more particularly to a simplified cartridge construction which enables easy replacement of a porous physically solid filter medium after the latter has become clogged due to prolonged use, and further increases the time during which the porous filter medium is operative.

This invention is an improvement on our invention described and claimed in our copending application Ser. No. 272,002, filed Apr. 10, 1963.

In the past, various means for conditioning the aqueous medium contained in aquariums for the keeping of aquatic life such as fish, lobsters, and other marine life, either domestically or commercially, have been provided. The present invention provides a novel structure which has utility as a container for improved filter medium for use in aquariums, as hereinafter more particularly described.

This invention will be better understood by having reference to the annexed drawings which are illustrative of a preferred embodiment of the present invention, and wherein:

FIG. 1 is a cross-sectional view of a cartridge of the present invention showing, also in cross section, a porous or foraminous physically solid filter medium and a pre-filter body containing porous filter material in place therein.

FIG. 2 is a bottom elevation of the apparatus shown in FIG. 1 showing the means for passing fluid through the bottom of the cartridge.

FIG. 4 is a partially cut away elevation of a foraminous physically solid filter medium of the type which is particularly useful in the cartridges of the present invention.

Briefly stated, the present invention is in the provision in a cartridge for a removable foraminous physically solid filter medium which has an axially disposed recess therein, of a pre-filter containing porous material, and characterized by a base, a pre-filter hollow body, hollow filter body, and a removable cover. The base and pre-filter body include means for permitting fluid flow therethrough for contact with the exterior of the main filter medium. The hollow filter body is adapted to be secured to the hollow pre-filter body, which is in turn secured to the base and includes an inner wall defining a filter and a pre-filter medium receiving space, respectively, and an outer wall in spaced relation to the inner wall, and means are provided for maintaining the walls in such spaced relation. The removable cover includes means coacting with the inner wall to isolate the space between the walls from the filter medium receiving space and also separate means, including an opening through the cover, for coaction between the cover and the recess in the filter medium to isolate the recess from the filter medium receiving space.

Figure 5:
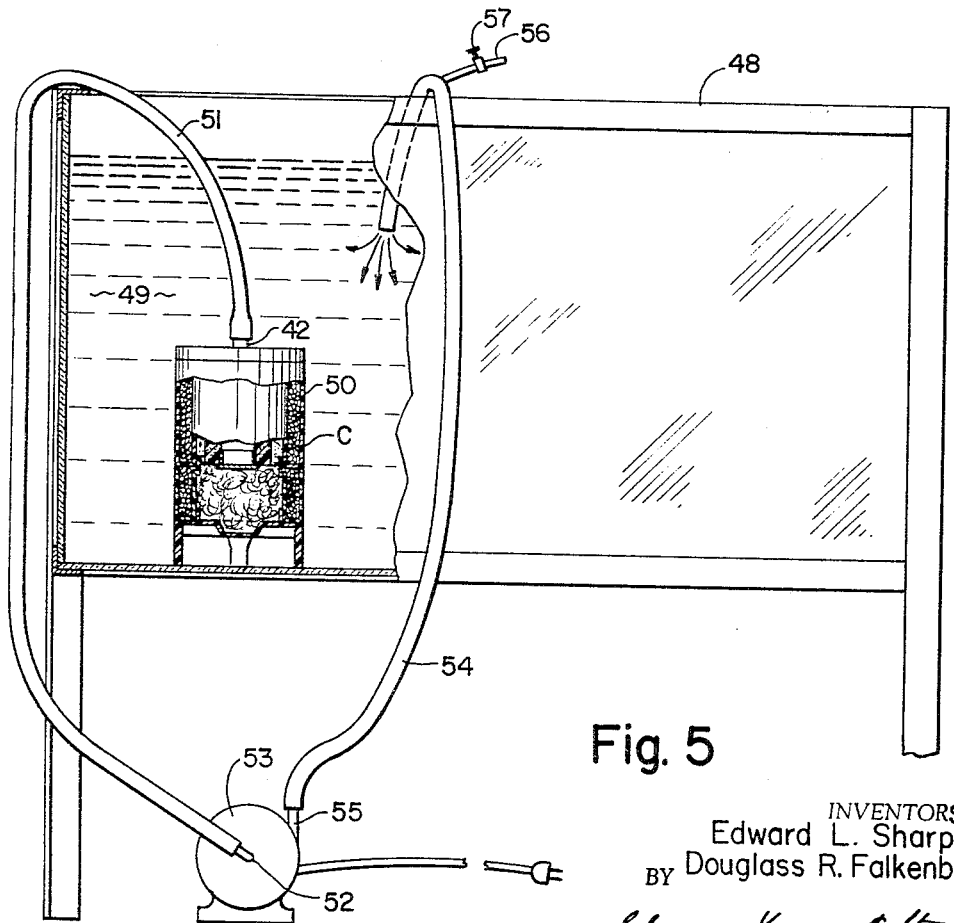
FIG. 5 shows a home type aquarium having the filter cartridge of this invention hooked up with a centrifugal pump and an aspirator for aeration.

In such an apparatus, then, the aqueous medium which is to be conditioned is drawn into the cartridge through the base, and fills the space defined by the inner wall of the pre-filter body and after filtering through a pre-filter medium, said aqueous medium is further drawn into the space defined by the inner wall and the foraminous filter medium. The fluid is passed through the filter medium, and exits from the system through the opening in the cover which communicates with the axially disposed recess in the filter medium. The apparatus is conveniently used in conjunction with a centrifugal pump as shown in FIG. 5.

Figure 3:
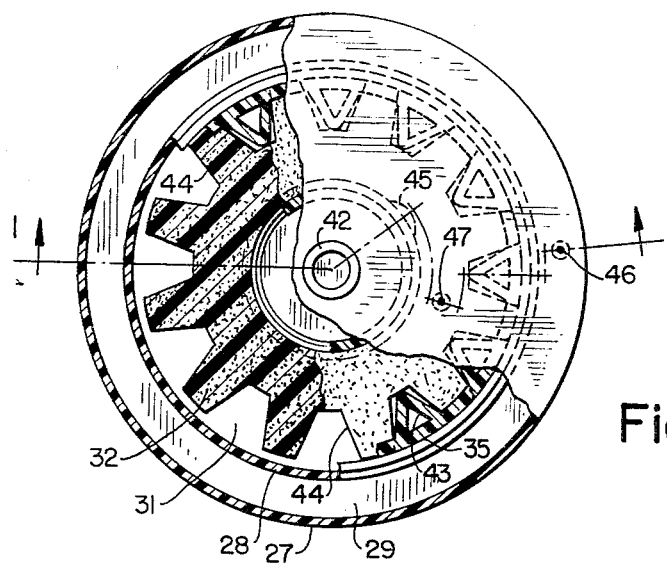
FIG. 3 is a partially cut away top elevation of the device shown in FIG. 1, successive layers having been partially cut away to better show details thereof.

Referring now more particularly to FIGS. 1-3, there is provided a base 10, which in the embodiment shown is conveniently circular, and formed from an extrudable plastic material, such as, polyethylene. Base 10 is provided with a plurality of legs 11 which, while not essential elements, serve a useful function in spacing the cartridge from the bottom of an quarium such as shown in FIG. 5 to aid in the flow of the aqueous medium to the opening through the base 10.

While any convenient opening through base 10 may be provided, in a preferred embodiment the opening is conveniently in the form of a frusto-conical section coaxially disposed and generally indicated by the numeral 12. Slits 13 provide an adequate passageway through the base, such slits preferably being disposed along elements of the frusto-conical fluid admitting means 12. By utilizing such a structure, the danger of drawing smaller fish, for example, into the interior of the cartridge is reduced.

Base 10 is provided with an upstanding circular rim 14 which defines a peripheral annular shoulder 15 against which the double walled hollow pre-filter body 16 is conveniently seated. Circular rim 14 is sized and positioned to frictionally engage and retain double walled body 16.

Base 10 is also conveniently provided with a plurality of supporting points 17 which serve to support the foraminous fibrous filter medium in the pre-filter body 16 in spaced relation to the base 10 thereby aiding the flow of fluid for distribution to the fibrous filter medium.

Base 10, as indicated above, can be cast as a unit in an extrusion type plastic molding machine using polyethylene, or any other suitable thermoplastic, water insoluble resinous material.

Pre-filter cartridge body 16, as indicated above, is desirably a double walled body having an outer wall 18 and an inner wall 19 in concentric spaced relation to each other and defining an annular chamber 20. Cylindrical walls 18 and 19 are desirably maintained in spaced relation by an integrally cast annular ring 21 at one extremity, and preferably adapted for coaction with the base 10 to firmly seat against shoulder 15 to provide rigid support for the pre-filter body 16.

The pre-filter body 16 is provided with an upstanding circular rim 24 which is frictionally retained against the circumference of the inner wall 28 of the double walled hollow filter body 26.

The filter body 26, as indicated above, is desirably a double walled body having an outer wall 27 and an inner wall 28 in concentric spaced relation to each other and defining an annular chamber 29. Cylindrical walls 27 and 28 are desirably maintained in spaced relation by an integrally cast annular ring 30 at one extremity, and preferably adapted for coaction with the pre-filter body 16 to firmly seat against the upper extremity 25 of outer wall 16 to provide rigid support for the body 26.

The annular chambers 20 and 29 provide a space into which a liquid, solid, or a combination of the two may be disposed for decorative purposes, and also serving as ballast to hold the cartridge-filter medium assembly in submerged, substantially stationary position in an aquarium. For example, it has been found decorative to fill the annular chambers 20 and 29 with a colored gravel of the same or contrasting color with the gravel normally used to provide a decorative base in a home aquarium.

Inner cylindrical wall 19 defines an inner chamber 22 which is adapted to receive a fibrous pre-filter medium generally indicated at 23, such as, for example, glass wool. As indicated above, inner cylindrical wall 19 is formed on a diameter which is adapted to coact with upstanding circular rim 14 for frictional engagement of the body 16 with the base 10.

Inner cylindrical wall 28 defines an inner chamber 31 which is adapted to receive the foraminous physically solid filter medium generally indicated at 32. As indicated above, inner cylindrical wall 28 is formed on a diameter which is adapted to coact with upstanding circular rim 24 for frictional engagement of the filter body 26 with the pre-filter body 16.

The cartridge is completed by a cover generally indicated at 33. Cover 33 is provided with an outer circular depending skirt 34 which is adapted to coact with outer wall 27, and an inner circular rim 35 concentric therewith and of a smaller diameter than depending rim or skirt 34. Depending circular rim 35 is adapted to frictionally coact with friction ring 36 which is integrally cast with inner cylindrical wall 28. Circular rim 35 also coacts with friction retaining ring 36 to isolate annular chamber 29 from the filter medium receiving chamber 31. In the assembled condition, the outer depending skirt 34 abuts against the upper edge 37 of outer cylindrical wall 27. Provision of more complex sealing means for outer chamber 29 is unnecessary. However, because inner chamber 31, with the exception of the fluid inlet generally indicated at 12 is desirably fluid-tight, depending circular rim 35 overlaps friction retaining ring 36 for a distance sufficient to assure a substantially fluid-tight seal.

Cover 33 is also provided with a still smaller diameter circular depending skirt 38 which is adapted to coact with recess 39 in foraminous filter medium 32, such coaction being in fluid-tight relationship. Depending circular skirt 38 defines a cup 40 which collects fluid which has passed through foraminous filtering medium 32 and conducts it to opening 41 in cover 33 which is conveniently provided with nipple 42 to which a hose, for example a plastic tube, may be secured as shown in FIG. 5.

Recess 39 in foraminous filter 32 may be provided most conveniently by inserting plastic plug 60 in one end of bore 44a which is axially formed in foraminous filter 32. An ordinary bottle cork could provide a suitable plug 60. Alternatively, the foraminous filter member 32 may be formed so that one end is closed so that aqueous fluid is forced to pass through the pores in the filter medium.

The pre-filtering medium 23 may be of any inert, fibrous material since the pre-filter is used in filtering out the larger particles which block the pores of the main porous filtering medium 32.

The filter medium 32 may be of any foraminous physically solid material, such as, porous carbon, porous alumina, porous sintered metal, or porous accreted resin bonded fibrous material. Very satisfactory results have been secured with a relatively rigid, self-supporting, thick walled tubular element composed entirely of resin-impregnated fibrous material. Such devices are completely disclosed in Patent 2,539,768, and the method of forming such filter elements is fully disclosed in the Patent 2,539,767.

As indicated and disclosed in these references, the combined filtering elements are intended for use in filtering liquids and particularly aqueous media that are caused to flow radially inwardly through the filtering elements under a differential pressure. In order to obtain the maximum filtering efficiency, the larger particles are first filtered out in the pre-filter medium. The fibrous structure of the main filtering element is of graded porosity, with the size of the pores progressively increasing radially outwardly toward the outer surface. By virtue of such graded porosity or density, as the fluid flows inwardly through progressively smaller and more numerous interstices, the foreign particles to be filtered out penetrate varying ducts according to their size. The graded porosity in the filter element is accomplished by accreting resin-impregnated fibers from a liquid dispersion of such fibers under controlled conditions as to the amount of vacuum used in effecting such accretion and as to the composition characteristics of the fibrous stock used. In making the filter element, wool fibers are the principal fibrous materials employed with up to 40% by weight of other fibers such as esparto, Yucca, asbestos and the like. The fibrous material is first beaten and added to a liquid dispersion of a resin such as melamine-formaldehyde, in a solvent, or any suitable liquid suspending medium. The resulting mixture is brought to proper consistency and then fed to felting tank where it is kept thoroughly agitated in order to maintain a uniform consistency throughout the entire mass.

In accordance with the disclosure of Patent 2,539,767, there is employed a perforated former or die which is immersed in the liquid suspension of fibers within the felting tank, and the resin-impregnated fibers are caused to be accreted upon the formers by the application of a controlled degree of suction imposed upon the interior of such formers. By controlling the degree of vacuum and the length of time over which it is applied, in conjunction with the proper control of the characteristics of the fibers, a filter medium is produced of the depth, or thickness, and graded porosity that is desired. The proportion of resin in the fibrous body is also a factor in producing a filter element of the desired degree of strength to withstand the pressure drive to which it may be subjected in use. A specific composition that has been found particularly suitable is one comprising 85% wool fibers and 15% esparto fibers, and having 35% resin content by weight of the finished filter element.

The filter elements may be used in the cylindrical form having a slightly tapered bore axially disposed therein, such bore being the result of forming the filter medium upon a tapered porous former or mandrel. It is preferred in the filtering of aquarium media that the filter be fluted, as is best shown in FIGS. 2 and 4, in order to increase the surface exposed to the aqueous medium to be filtered, and also to present a variety of porosities to the medium being filtered.

In order to stabilize a filter medium shaped with longitudinal flutes or grooves, and prevent undesirable rotation thereof and possible breaking of desired fluid-tight seals, there have been provided and integrally cast with cover 33 a plurality of circumferentially disposed stabilizing fingers or projections 43 which coact with the grooves 44 longitudinally cut in the body of filter medium 32.

Also as shown in FIG. 1, there are conveniently provided one or more detents 45 (diverging toward the exterior) on the outer marginal surface of cup 40 for the purpose of aiding in frictionally seating and retaining filter member 32 in fluid-tight sealing engagement therewith.

In order to permit air to escape from the cartridge when the assembly is initially submerged in the aquarium as shown in FIG. 5, a plurality of spaced air release vents 46 may be provided to exhaust air from chamber 29, and one or more air release vents 47 may be provided to release air from the inner chamber 31.

FIG. 5 shows a conventional home type aquarium fitted with the filter and filter cartridges of the present invention in one system which may be used for conditioning the water contained therein. Accordingly, there is here shown an aquarium 48 containing an aqueous medium generally indicated at 49. The aqueous medium may be either fresh water or saline depending upon the nature of the aquatic life contained therein. A filter cartridge of the type shown in FIG. 1 is generally indicated at C, that portion corresponding to chamber 29 being filled with a gravel ballast 50 to aid in maintaining the cartridge on the bottom of the aquarium 48. Outlet tube 51 is conveniently any flexible tubular material such as polyethylene, and is secured to the cartridge C by forcing the tubing 51 over the nipple 42. Tubing 51 is connected to the inlet 52 of centrifugal pump 53. Return line 54 is connected to the outlet 55 and returns the filtered aqueous medium to aquarium 48. As indicated above, the return line may be provided with a small diameter air bleed-in tube 56 having clamp 57 thereon for regulating the amount of air introduced into the line.

The apparatus shown in FIG. 5 provides a very convenient means for adequately conditioning the water for the maintenance of marine life in a domestic or commercial aquarium, particularly for display or decorative purposes. The water is conditioned not only helpfully for the marine life, but because of the remarkable clarity, the decorative aspects of an aquarium so fitted are greatly enhanced.

As indicated above, instead of using the preferred pre-filter porous fibrous medium 23 and the resin bonded fibrous filter medium 32 above described, there may also be used other foraminous media used in combination with the pre-filter which in addition to removing undesired foreign particulate material from an aqueous medium, may also serve to condition the aqueous medium by removing one or more dissolved components, or by itself dissolving and beneficially fortifying an aqueous medium being passed therethrough. For example, a filter medium having substantially the same shape as shown in the annexed drawings and formed from activated carbon may be used to clarify an aqueous medium containing unfilterable colloidally dispersed particles, such as waste proteins.

It has been found that the filtering apparatus of the present invention results in a life for the physically solid filtering medium of from 2 to 4 times the life previously available in devices not employing the improvements hereof.

It has been found most unexpectedly, that the melamine-formaldehyde resin binder used in forming the resin bonded fibrous filter media as described in Patent 2,539,768 coacts especially with fresh water and saline media to reduce the quantity of nitrogen-containing contaminants. In aquarium media, excessive build up of nitrogen containing contaminants from the waste products of aquatic animal life, particularly in the case of lobsters, seriously limits the length of time that such animals can be kept alive. It has been found that the melamine-formaldehyde resin as deposited from a 50% solids solution in butyl alcohol is particularly effective as an adsorbent for nitrogenous matter.

In an ordinary 15 gallon fresh water fish tank, it has been found that with a normal stock of tropical fish, these filter media are effective to maintain the aquarium medium brilliantly clear and at a bacteria count which is less than the bacterial count in municipally treated drinking water for periods of time ranging upwards of two months. The replacement filter media are relatively inexpensive, and because of the simplified construction of the cartridge are readily replaced.

Using a centrifugal pump such as shown in FIG. 5, and a plastic or polyethylene return pipe, the pipe may be provided with means for admitting air into the return line so that oxygen is continuously admitted to the returning stream to maintain the oxygen level in the water at the proper point to sustain aquatic life.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A filter comprising in combination:
 (a) a base including means for permitting fluid flow therethrough;
 (b) a pre-filter body including a cylindrical hollow body having an inner cylindrical wall adapted to be secured to said base and an outer cylindrical wall spaced therefrom, means for maintaining said inner and outer pre-filter body walls in spaced relation, and means to secure said pre-filter body to the base;
 (c) a removable fibrous pre-filter medium positioned in said pre-filter body;
 (d) a hollow main filter body adapted to be secured to said pre-filter body including an inner cylindrical wall defining a filter medium receiving space, and an outer cylindrical wall in spaced relation thereto, and means for maintaining said inner and outer main filter body walls in spaced relation;
 (e) means frictionally coacting between the inner cylindrical wall of the pre-filter body and the adjacent portion of the inner cylindrical wall of the main filter body to provide a continuous sealed inner chamber coextensive with the pre-filter body and the main filter body, the outer cylindrical walls of said pre-filter body and said main filter body being in abutting and supporting relationship;
 (f) a removable physically solid porous filter medium having an axially disposed recess positioned in said main filter body, one end of said recess being adjacent said pre-filter medium, means closing said one end, said solid filter medium being so related to said pre-filter medium that fluid flows successively through said pre-filter medium and said solid filter medium, and into the recess of said solid filter medium;
 (g) a removable cover for said main filter body including means frictionally coacting with the inner wall of said main filter body to retain said cover in body closing relation, and also including means integral therewith coacting with the other end of the recess of said solid filter medium for closing said recess and frictionally retaining said porous filter medium within said main filter body; and
 (h) an opening extending through the cover and communicating with the recess in said solid filter medium through which filtered fluid is removed from said recess.

2. A filter in accordance with claim 1 wherein the base includes a concentric upstanding circular rim dimensioned to coact frictionally with the inner surface of the inner cylindrical wall of said pre-filter body.

3. A filter in accordance with claim 1 wherein the means frictionally coacting between the inner cylindrical wall of the pre-filter body and the adjacent inner cylindrical wall of the main filter body includes a rim extending from said pre-filter and dimensioned to be frictionally retained within the lower portion of the said main filter body.

References Cited by the Examiner

UNITED STATES PATENTS

| | | | |
|---|---|---|---|
| 619,569 | 2/1899 | Hewel | 210—458 |
| 2,539,768 | 1/1951 | Anderson | 210—457 X |
| 2,732,950 | 1/1956 | Keight et al. | 210—186 |
| 2,781,913 | 2/1957 | Thompson | 210—496 X |
| 3,160,588 | 12/1964 | Alarie | 210—169 |

REUBEN FRIEDMAN, *Primary Examiner.*

SAMIH N. ZAHARNA, *Examiner.*